(12) United States Patent
Wu et al.

(10) Patent No.: US 12,610,136 B1
(45) Date of Patent: Apr. 21, 2026

(54) VISUAL IMAGE PROCESSING METHOD AND APPARATUS BASED ON STRAIN MECHANISM, DEVICE AND MEDIUM

(71) Applicant: SICHUAN KANGJISHENG TECHNOLOGY CO., LTD, Chengdu (CN)

(72) Inventors: Qinzhang Wu, Chengdu (CN); Xiaoyin Hu, Chengdu (CN); Xiuwen Wu, Chengdu (CN)

(73) Assignee: SICHUAN KANGJISHENG TECHNOLOGY CO., LTD, Chengdu (CN)

( * ) Notice: Subject to any disclaimer, the term of this patent is extended or adjusted under 35 U.S.C. 154(b) by 0 days.

(21) Appl. No.: 19/233,121

(22) Filed: Jun. 10, 2025

(30) Foreign Application Priority Data

Jan. 24, 2025 (CN) .......................... 202510112354.3

(51) Int. Cl.
*H04N 23/65* (2023.01)
*G06V 10/40* (2022.01)

(52) U.S. Cl.
CPC ........... *H04N 23/651* (2023.01); *G06V 10/40* (2022.01)

(58) Field of Classification Search
CPC ...... H04N 23/651; H04N 23/20; G06V 10/40; G06V 10/20; G06F 18/213; G06F 18/24
See application file for complete search history.

(56) References Cited

U.S. PATENT DOCUMENTS 5,875,264 A * 2/1999 Carlstrom ............ G06V 30/184
382/181
10,089,548 B2 * 10/2018 Ando ...................... G06F 18/24
(Continued)

FOREIGN PATENT DOCUMENTS

| CN | 101609547 A | 12/2009 |
| CN | 104105445 A | 10/2014 |
| CN | 105488760 A | 4/2016 |

(Continued)

OTHER PUBLICATIONS

Notification to Grant Patent Right for Invention, Chinese Application No. 202510112354.3, mailed Mar. 12, 2025 (3 pages).
(Continued)

*Primary Examiner* — Ahmed A Berhan
(74) *Attorney, Agent, or Firm* — HOWARD M COHN and Associates, LLC

(57) ABSTRACT

The invention discloses a visual image processing method and apparatus based on a strain mechanism, a device and a medium. The visual image processing method based on a strain mechanism includes: acquiring a plurality of pieces of photon energy information based on a CCD camera or an infrared camera, and extracting variable elements between photons based on the photon energy information; generating a plurality of energy fields according to the variable elements; and performing spatial reasoning according to the feature information of the energy fields to obtain a geometric shape of an object. The invention belongs to the field of image processing, realizes a "general algorithm" for visual image processing, solves global application problems, may accurately and reliably find a target of interest in any environments, and reduces energy consumption.

7 Claims, 1 Drawing Sheet

Acquire a plurality of pieces of photon energy information based on a CCD camera or an infrared camera, and extract variable elements between photons based on the photon energy information ~ S11

Generate a plurality of energy fields according to the variable elements between the photons ~ S12

Perform spatial reasoning according to the feature information of the energy fields, and splice the energy fields to obtain a geometric shape of an object ~ S13

(56) References Cited

U.S. PATENT DOCUMENTS

| | | | | | |
|---|---|---|---|---|---|
| 10,614,560 | B2 * | 4/2020 | Liu | ...................... | G06T 1/0007 |
| 2014/0168482 | A1 | 6/2014 | Herman et al. | | |

FOREIGN PATENT DOCUMENTS

| | | | |
|---|---|---|---|
| CN | 116843955 | A | 10/2023 |
| WO | 2021008427 | A1 | 1/2021 |
| WO | 2021120405 | A1 | 6/2021 |
| WO | 2022170824 | A1 | 8/2022 |

OTHER PUBLICATIONS

Xine Li et al., "China Doctoral Dissertation Full-text Database (Information Technology Edition)", Study on Image Mosaic and Fusion of Large Field View Multi-spectral Camera, full text, issued date Oct. 15, 2015.

Jiansi Liu et al., "China Excellent Master's Thesis Full-text Database (Information Technology Edition)", Research an kev technology of three dimensional photon counting integrated imaging, full text, issued date Feb. 15, 2023.

Hongyu Zhong et al., "Journal of Data Acquisition and Processing", Photon Counting Image Enhancement Algorithm Based on Improved Regional Energy Fusion Rules, vol. 34, Issue 01, full text, issued date Mar. 27, 2020.

* cited by examiner

Acquire a plurality of pieces of photon energy information based on a CCD camera or an infrared camera, and extract variable elements between photons based on the photon energy information ~ S11

Generate a plurality of energy fields according to the variable elements between the photons ~ S12

Perform spatial reasoning according to the feature information of the energy fields, and splice the energy fields to obtain a geometric shape of an object ~ S13

VISUAL IMAGE PROCESSING METHOD AND APPARATUS BASED ON STRAIN MECHANISM, DEVICE AND MEDIUM

BACKGROUND OF THE INVENTION

1. Technical Field

The invention relates to the field of image processing, in particular to a visual image processing method and apparatus based on a strain mechanism, a device and a medium.

2. Description of Related Art

Visual image processing, as an interdisciplinary field, combines knowledge in many aspects such as computer science, mathematics, physics and engineering science and focuses on the extraction of useful information from digital images or videos. Visual image processing aims to simulate the capacity of a human visual system to automatically interpret, appreciate and operate image data to realize a series of applications such as object recognition, scene understanding, image enhancement and medical diagnosis.

With the continuous development of artificial intelligence, visual image processing technologies witness a rapid development, and the deep learning technology based on neural networks and the large-scale model technology are commonly used at present. However, the visual image processing technologies require a large quantity of sample data for model training, but it is difficult to acquire high-quality training samples under various conditions due to the change of environment; in addition, due to the increase in the number of parameters of models and the complexity of the models, powerful hardware support is needed, leading to the problems of a large amount of calculation, high energy consumption and high costs. In view of this, it is urgently needed to propose a low-cost visual image processing method.

BRIEF SUMMARY OF THE INVENTION

The invention provides a visual image processing method and apparatus based on a strain mechanism, a device and a medium to solve the technical problem of high energy consumption of visual image processing in the prior art and realize the technical effect of low-energy image processing.

In a first aspect, the invention provides a visual image processing method based on a strain mechanism, including:

acquiring a plurality of pieces of photon energy information based on a CCD camera or an infrared camera, and extracting variable elements between photons based on the photon energy information, wherein the variable elements include a fluctuation difference variation, a dimensionality variation and a frequency variation;

generating a plurality of energy fields according to the variable elements between the photons, wherein each of the energy fields includes a plurality of pieces of feature information, and types of the feature information include boundary features, form features and scale features; and performing spatial reasoning according to the feature information of the energy fields, and splicing the energy fields to obtain a geometric shape of an object.

Further, acquiring a plurality of pieces of photon energy information based on a CCD camera or an infrared camera includes:

acquiring a plurality of pieces of photon energy information by the CCD camera or the infrared camera, and converting the plurality of pieces of photon energy information into an electronic signal; and generating, by the CCD camera or the infrared camera, a target image corresponding to the plurality of pieces of photon energy information.

Further, extracting variable elements between photons based on the photon energy information includes:

extracting fluctuation differences between photon energy of pixels in each row of pixels in the target image based on a preset detection algorithm;

performing division according to a plurality of fluctuation differences in each row to obtain a plurality of energy segments; and acquiring a frequency of each energy segment, and determining an initial spatial position, an end spatial position and a length corresponding to the energy segment.

Further, performing division according to a plurality of fluctuation differences in each row to obtain a plurality of energy segments includes:

sequentially determining the fluctuation differences between the pixels in each row in the target image according to a sequence of the pixels in each row of pixels in the target image; and performing division when the fluctuation difference between two pixels in each row is greater than a preset fluctuation threshold, to obtain one energy segment.

Further, generating a plurality of energy fields according to the variable elements between the photons includes:

combining energy segments that have the same photon energy and are adjacent to each other according to the initial spatial positions, the end spatial positions and the lengths corresponding to the plurality of energy segments, to obtain a plurality of energy fields; and performing boundary information extraction on the energy fields to obtain feature information corresponding to the energy fields.

Further, combining energy segments that have the same photon energy and are adjacent to each other according to the initial spatial positions, the end spatial positions and the lengths corresponding to the plurality of energy segments, to obtain a plurality of energy fields includes:

determining whether energy segments with the same photon energy are adjacent to each other according to the initial spatial positions and the end spatial positions corresponding to the energy segments with the same photon energy; and splicing energy segments that are adjacent to each other and have the same photon energy according to the lengths of the energy segments to obtain one energy field.

Further, performing spatial reasoning according to the feature information of the energy fields and splicing the energy fields to obtain a geometric shape of an object include:

performing spatial adjacent splicing according to form features of the energy fields to obtain a body form;

performing geometric feature analysis on the body form to obtain a geometric center;

constructing geometric framework segments based on the geometric center; and obtaining the geometric shape of the object in the target image according to the geometric framework segments.

In a second aspect, the invention provides a visual image processing apparatus based on a strain mechanism, including:

an element extraction module, configured to acquire a plurality of pieces of photon energy information based on a CCD camera or an infrared camera and extract variable elements between photons based on the photon energy information, wherein the variable elements include a fluctuation difference variation, a dimensionality variation and a frequency variation;

an energy field division module, configured to generate a plurality of energy fields according to the variable elements between the photons, wherein each of the energy fields includes a plurality of pieces of feature information, and types of the feature information include boundary features, form features and scale features; and a shape generation module, configured to perform spatial reasoning according to the feature information of the energy fields and splice the energy fields to obtain a geometric shape of an object.

In a third aspect, the invention provides an electronic device, including:

a processor; and a memory used for storing processor-executable instructions;

wherein, the processor is configured to implement, with low power and a small amount of calculation, the visual image processing method based on a strain mechanism provided in the first aspect of the invention.

In a fourth aspect, the invention provides a non-temporary computer-readable storage medium, wherein when instructions in the storage medium are executed by a processor of an electronic device, the electronic device is enabled to implement the visual image processing method based on a strain mechanism provided in the first aspect.

The one or more technical solutions provided by the invention have at least the following technical effects or advantages:

The invention provides a visual image processing method based on a strain mechanism, including: acquiring a plurality of pieces of photon energy information based on a CCD camera or an infrared camera, and extracting variable elements between photons based on the photon energy information, wherein the variable elements include a fluctuation difference variation, a dimensionality variation and a frequency variation; generating a plurality of energy fields according to the variable elements between the photons, wherein each of the energy fields includes a plurality of pieces of feature information, and types of the feature information include boundary features, form features and scale features; and performing spatial reasoning according to the feature information of the energy fields, and splicing the energy fields to obtain a geometric shape of an object. The visual image processing technique based on a strain mechanism provided by the invention realizes a "general algorithm" for visual image processing, solves global application problems, and may accurately and reliably find a target of interest in any environments; and training and learning are not needed, such that the amount of calculation and energy consumption are reduced.

BRIEF DESCRIPTION OF THE SEVERAL VIEWS OF THE DRAWINGS

To more clearly explain the technical solutions in the embodiments of the invention, drawings used for describing the embodiments are briefly introduced below. Obviously, the drawings in the following description merely illustrate some embodiments of the invention, and those ordinarily skilled in the art may obtain other drawings according to the following ones without creative labor.

FIG. 1 is a flow diagram of a visual image processing method based on a strain mechanism according to the invention.

DETAILED DESCRIPTION OF THE INVENTION

The embodiments of the invention provide a visual image processing method based on a strain mechanism to solve the technical problem of high energy consumption of visual image processing in the prior art.

To solve the above technical problem, the general thought of the technical solutions of the invention is as follows:

A visual image processing method based on a strain mechanism includes: acquiring a plurality of pieces of photon energy information based on a CCD camera or an infrared camera, and extracting variable elements between photons based on the photon energy information, wherein the variable elements include a fluctuation difference variation, a dimensionality variation and a frequency variation; generating a plurality of energy fields according to the variable elements between the photons, wherein each of the energy fields includes a plurality of pieces of feature information, and types of the feature information include boundary features, form features and scale features; and performing spatial reasoning according to the feature information of the energy fields, and splicing the energy fields to obtain a geometric shape of an object.

To gain a better understanding of the above technical solution, the technical solution is described in detail below in conjunction with accompanying drawings and specific embodiments.

First, it should be noted that the term "and/or" is used here merely for describing the relations between associated objects and may indicate three relations. For example, A and/or B may indicate a case where only A exists, a case where both A and B exist, and a case where only B exists. In addition, the character "/" used here generally indicates an "or" relation between associated objects.

The invention provides a visual image processing method based on a strain mechanism, which as shown in FIG. 1, includes Steps S11-S13:

S11, acquiring a plurality of pieces of photon energy information based on a CCD camera or an infrared camera, and extracting variable elements between photons based on the photon energy information, wherein the variable elements include a fluctuation difference variation, a dimensionality variation and a frequency variation.

Specifically, acquiring a plurality of pieces of photon energy information based on a CCD camera or an infrared camera includes: acquiring a plurality of pieces of photon energy information by the CCD camera or the infrared camera, and converting the plurality of pieces of photon energy information into an electronic signal; and generating, by the CCD camera or the infrared camera, a target image corresponding to the plurality of pieces of photon energy information.

The infrared camera or the CCD camera has a CCD that is used as a photosensitive element. When photons hit a pixel on the CCD, a certain number of electron-hole pairs will be generated based on the photoelectric effect. The number of generated electrons is in proportion to the energy of the incident photons, and the photons are collected and stored in a capacitor. Accumulated electric charges are converted into a digital signal by means of an analog-to-digital converter (ADC) to form an energy value in an image.

Extracting variable elements between photons based on the photon energy information includes: extracting fluctuation differences between photon energy of pixels in each row of pixels in the target image based on a preset detection algorithm; performing division according to a plurality of fluctuation differences in each row to obtain a plurality of energy segments; and acquiring a frequency of each energy segment, and determining an initial spatial position, an end spatial position and a length corresponding to the energy segment.

The preset detection algorithm may be an edge detection algorithm or the like, and is not limited here. It may be understood that the target image is formed by a plurality of pixels, the pixels in the target image are divided into a plurality of rows, each row includes a plurality of pixels, and each pixel has a fixed photon energy value (or a fixed gray value). In each row of pixels, differences between the energy values of the pixels are fluctuation differences between the pixels.

Performing division according to a plurality of fluctuation differences in each row to obtain a plurality of energy segments includes: sequentially determining the fluctuation differences between the pixels in each row in the target image according to a sequence of the pixels in each row of pixels in the target image; and performing division when the fluctuation difference between two pixels in each row is greater than a preset fluctuation threshold, to obtain one energy segment.

For example, the first row of the target image includes ten pixels, and energy values of the ten pixels in the first row are sequentially 1, 1, 2, 2, 3, 1, 5, 4, 6 and 5. Differences between the energy value of the first pixel and the energy values of the other nine pixels are calculated in sequence; when the difference between the energy value of the first pixel and the energy value of another pixel in the same row is greater than a preset fluctuation threshold, the pixels before said pixel in the same row are divided into one energy segment. For example, if the preset fluctuation threshold 2 is set as 2, the difference between the energy value of the first pixel and the energy value of the seventh pixel is greater than 2, so the first, second, third, fourth, fifth and sixth pixels are divided into one energy segment, and calculation is performed again with the seventh pixel as a new initial pixel.

The frequency of the energy segment refers to the number of photons falling within the energy segment in a certain time. The radiance or brightness corresponding to the energy segment may be obtained according to the number of the photons.

For the target image, each pixel has coordinates (x, y), the initial spatial position corresponding to the energy segment is the position of the first pixel in the energy segment, that is, a coordinate pair formed by a minimum row number and a minimum column number; the end spatial position corresponding to the energy segment is the position of the last pixel in the energy segment, that is, a coordinate pair formed by a maximum row number and a maximum column number; and the length of the energy segment refers to the number of pixels in the energy segment (or, a maximum distance in the row direction).

S12, generating a plurality of energy fields according to the variable elements between the photons, wherein each of the energy fields includes a plurality of pieces of feature information, and types of the feature information include boundary features, form features and scale features.

Generating a plurality of energy fields according to the variable elements between the photons includes: combining energy segments that have the same photon energy and are adjacent to each other according to the initial spatial positions, the end spatial positions and the lengths corresponding to the plurality of energy segments, to obtain a plurality of energy fields; and performing boundary information extraction on the energy fields to obtain feature information corresponding to the energy fields.

Two energy segments with the same photon energy have the same energy value.

Combining energy segments that have the same photon energy and are adjacent to each other according to the initial spatial positions, the end spatial positions and the lengths corresponding to the plurality of energy segments, to obtain a plurality of energy fields includes: determining whether energy segments with the same photon energy are adjacent to each other according to the initial spatial positions and the end spatial positions corresponding to the energy segments with the same photon energy; and splicing energy segments that are adjacent to each other and have the same photon energy according to the lengths of the energy segments to obtain one energy field.

It should be particularly noted that energy segments that have the same photon energy, but are not adjacent to each other should not be divided into the same energy field, and "adjacent" means that pixels in the energy segments have at least one same y value, and the difference between the x values of the pixels is 1. For example, the initial spatial position of an energy segment A in the first row is (1.1), the end spatial position of the energy segment A is (1.10), the initial spatial position of an energy segment B in the second row is (2.5), the end spatial position of the energy segment B is (2.10), the initial spatial position of an energy segment C in the third row is (3.9), the end spatial position of the energy segment C is (3.10), the initial spatial position of an energy segment D in the third row is (3.20), an end spatial position of the energy segment D is (3.22), and the energy segments A, B, C and D have the same energy value.

Obviously, the energy segment A is adjacent to the energy segment B, the energy segment B is adjacent to the energy segment C, and the energy segment B is not adjacent to the energy segment D, so the energy segment A, the energy segment B and the energy segment C are spliced to obtain one energy field.

By performing the boundary information extraction on the energy fields, the outer contour of each of the energy segments may be accurately recognized and depicted, then the geometric shape, structural complexity and spatial expansion of the energy fields are further analysed, and finally, boundary features (such as boundary length and curvature), form features (such as area, perimeter, circularity and direction of principal axis) and scale features (such as location of the center of mass, size of an bounding box, and equivalent diameter) are obtained.

S13, performing spatial reasoning according to the feature information of the energy fields and splicing the energy fields to obtain a geometric shape of an object.

Performing spatial reasoning according to the feature information of the energy fields and splicing the energy fields to obtain a geometric shape of an object include: performing spatial adjacent splicing according to form features of the energy fields to obtain a body form; performing geometric feature analysis on the body form to obtain a geometric center; constructing geometric framework segments based on the geometric center; and obtaining the geometric shape of the object in the target image according to the geometric framework segments.

First, the form features of the energy fields are analyzed to recognize the specific shape, size and spatial distribution of each of the energy segments. Based on the form features, portions that belong to the same object and are divided into different energy segments are combined by means of the spatial adjacent splicing technique to form a complete body form. After splicing, geometric feature analysis is performed on the body form to accurately figure out the geometric center of the body form. The geometric center is an average position of the coordinates of all points in the form and represents the spatial orientation core of the form. Based on the geometric center, geometric framework segments are constructed, that is, the main extension directions of the form are obtained by principal component analysis (PCA) or other methods, segments are drawn in these directions, and these segments reflect the basic framework and structural features of the form. Finally, the geometric shape of the object in the target image is obtained according to the constructed geometric framework segments.

To sum up, the invention provides a visual image processing method based on a strain mechanism, including: acquiring a plurality of pieces of photon energy information based on a CCD camera or an infrared camera, and extracting variable elements between photons based on the photon energy information, wherein the variable elements include a fluctuation difference variation, a dimensionality variation and a frequency variation; generating a plurality of energy fields according to the variable elements between the photons, wherein each of the energy fields includes a plurality of pieces of feature information, and types of the feature information include boundary features, form features and scale features; and performing spatial reasoning according to the feature information of the energy fields, and splicing the energy fields to obtain a geometric shape of an object. The visual image processing technique based on a strain mechanism provided by the invention realizes a "general algorithm" for visual image processing, solves global application problems, and may accurately and reliably find a target of interest in any environments; and training and learning are not needed, such that the amount of calculation and energy consumption are reduced.

Based on the same inventive concept, the invention provides a visual image processing apparatus based on a strain mechanism, including:

an element extraction module, configured to acquire a plurality of pieces of photon energy information based on a CCD camera or an infrared camera and extract variable elements between photons based on the photon energy information, wherein the variable elements include a fluctuation difference variation, a dimensionality variation and a frequency variation;

an energy field division module, configured to generate a plurality of energy fields according to the variable elements between the photons, wherein each of the energy fields includes a plurality of pieces of feature information, and types of the feature information include boundary features, form features and scale features; and a shape generation module, configured to perform spatial reasoning according to the feature information of the energy fields and splice the energy fields to obtain a geometric shape of an object.

Based on the same inventive concept, the invention further provides an electronic device, including:

a processor; and a memory used for storing processor-executable instructions;

wherein, the processor is configured to implement, with low power and a small amount of calculation, the visual image processing method based on a strain mechanism.

Based on the same inventive concept, the invention further provides a non-temporary computer-readable storage medium, wherein when instructions in the storage medium are executed by a processor of an electronic device, the electronic device is enabled to implement the visual image processing method based on a strain mechanism.

Because the electronic device introduced in this embodiment is an electronic device adopted for implementing the information processing method in the embodiment of the invention, those skilled in the art may appreciate the specific implementation of the electronic device in this embodiment and variations thereof based on the information processing method introduced in this embodiment, and how the method in the embodiment of the invention is implemented by the electronic device will not be detailed here. All electronic devices adopted by those skilled in the art to implement the information processing method in the embodiments of the invention should fall within the protection scope of the invention.

Those skilled in the art should understand that the embodiments of the invention may be provided as a method, a system or a computer program product. So, the embodiments of the invention may be pure hardware embodiments, pure software embodiments, or embodiments combining software and hardware. In addition, the invention may be in the form of a computer program product to be implemented on one or more computer-available storage media (including, but not limited to, a disk memory, a CD-ROM, an optical memory, and the like) including computer-available program codes.

The invention is described with reference to a flow diagram and/or block diagram of the method, device (system) and computer program product provided by the embodiments of the invention. It should be understood that each process and/or block in the flow diagram and/or block diagram and the combinations of processes and/or blocks in the flow diagram and/or block diagram may be implemented by computer program instructions. These computer program instructions may be configured in a general-purpose computer, a special-purpose computer, an embedded processor, or a processor of other programmable data processing devices to create a machine, so that the instructions may be executed by the computer or the processor of other programmable data processing devices to create an apparatus for realizing specific functions in one or more processes in the flow diagram and/or in one or more blocks in the block diagram.

These computer program instructions may also be stored in a computer-readable memory that may guide the computer or other programmable data processing devices to work in a specific manner, so that the instructions stored in the computer-readable memory may create a product including an instruction apparatus, and the instruction apparatus implements specific functions in one or more processes of the flow diagram and/or one or more blocks in the block diagram.

These computer program instructions may also be loaded on a computer or other programmable data processing devices, so that the computer or other programmable devices may perform a series of operation steps to carry out processing realized by the computer, and the instructions are executed on the computer or other programmable devices to realize specific functions in one or more processes in the flow diagram and/or one or more block diagrams in the block diagram.

Although preferred embodiments of the invention have been described above, those skilled in the art who have known the basic creative concept of the invention may make different alterations and modifications to these embodiments. So, the appended claims are intended to include the preferred embodiments and all alterations and modifications made within the scope of the invention.

Obviously, those skilled in the art may make various modifications and transformations to the invention without departing from the spirit and scope of the invention. If these modifications and transformations fall within the scope of the claims of the invention and their equivalent techniques, the invention intends to include all these modifications and transformations.

What is claimed is:

1. A visual image processing method based on a strain mechanism, comprising:

acquiring a plurality of pieces of photon energy information based on a CCD camera or an infrared camera, and extracting variable elements between photons based on the photon energy information, wherein the variable elements comprise a fluctuation difference variation, a dimensionality variation and a frequency variation; wherein, acquiring a plurality of pieces of photon energy information based on a CCD camera or an infrared camera comprises: acquiring a plurality of pieces of photon energy information by the CCD camera or the infrared camera, and converting the plurality of pieces of photon energy information into an electronic signal; and generating, by the CCD camera or the infrared camera, a target image corresponding to the plurality of pieces of photon energy information; extracting variable elements between photons based on the photon energy information comprises: extracting fluctuation differences between photon energy of pixels in each row of pixels in the target image based on a preset detection algorithm; performing division according to a plurality of fluctuation differences in each row to obtain a plurality of energy segments; and acquiring a frequency of each energy segment, and determining an initial spatial position, an end spatial position and a length corresponding to the energy segment;

generating a plurality of energy fields according to the variable elements between the photons, wherein each of the energy fields comprises a plurality of pieces of feature information, and types of the feature information comprise boundary features, form features and scale features; wherein, generating a plurality of energy fields according to the variable elements between the photons comprises: combining energy segments that have the same photon energy and are adjacent to each other according to the initial spatial positions, the end spatial positions and the lengths corresponding to the plurality of energy segments, to obtain a plurality of energy fields; and performing boundary information extraction on the energy fields to obtain feature information corresponding to the energy fields; and performing spatial reasoning according to the feature information of the energy fields, and splicing the energy fields to obtain a geometric shape of an object, wherein performing spatial reasoning according to the feature information of the energy fields and splicing the energy fields to obtain a geometric shape of an object comprise: performing spatial adjacent splicing according to form features of the energy fields to obtain a body form; performing geometric feature analysis on the body form to obtain a geometric center; constructing geometric framework segments based on the geometric center; and obtaining the geometric shape of the object in the target image according to the geometric framework segments.

2. The visual image processing method based on a strain mechanism according to claim 1, wherein performing division according to a plurality of fluctuation differences in each row to obtain a plurality of energy segments comprises:

sequentially determining the fluctuation differences between the pixels in each row in the target image according to a sequence of the pixels in each row of pixels in the target image; and performing division when the fluctuation difference between two pixels in each row is greater than a preset fluctuation threshold, to obtain one energy segment.

3. An electronic device, comprising:

a processor; and a memory used for storing processor-executable instructions;

wherein, the processor is configured to implement, with low power and a small amount of calculation, the visual image processing method based on a strain mechanism according to claim 2.

4. The visual image processing method based on a strain mechanism according to claim 1, wherein combining energy segments that have the same photon energy and are adjacent to each other according to the initial spatial positions, the end spatial positions and the lengths corresponding to the plurality of energy segments, to obtain a plurality of energy fields comprises:

determining whether energy segments with the same photon energy are adjacent to each other according to the initial spatial positions and the end spatial positions corresponding to the energy segments with the same photon energy; and splicing energy segments that are adjacent to each other and have the same photon energy according to the lengths of the energy segments to obtain one energy field.

5. An electronic device, comprising:

a processor; and a memory used for storing processor-executable instructions;

wherein, the processor is configured to implement, with low power and a small amount of calculation, the visual image processing method based on a strain mechanism according to claim 4.

6. A non-transitory computer-readable storage medium, wherein when instructions in the storage medium are executed by a processor of an electronic device, the electronic device is enabled to implement the visual image processing method based on a strain mechanism according to claim 4.

7. An electronic device, comprising:

a processor; and a memory used for storing processor-executable instructions;

wherein, the processor is configured to implement, with low power and a small amount of calculation, the visual image processing method based on a strain mechanism according to claim 1.

* * * * *